United States Patent Office 2,778,869
Patented Jan. 22, 1957

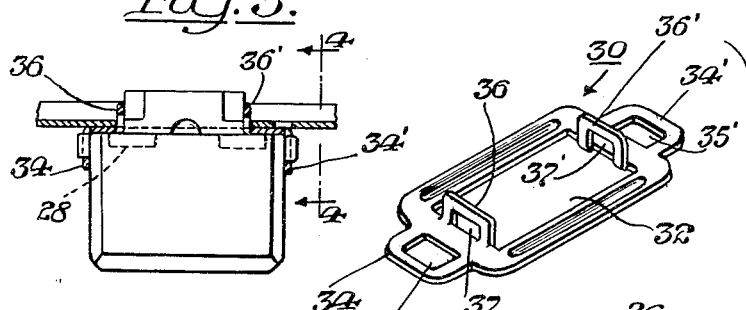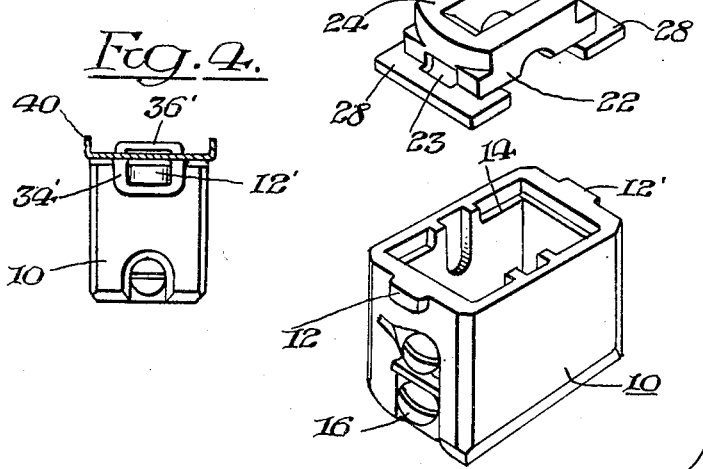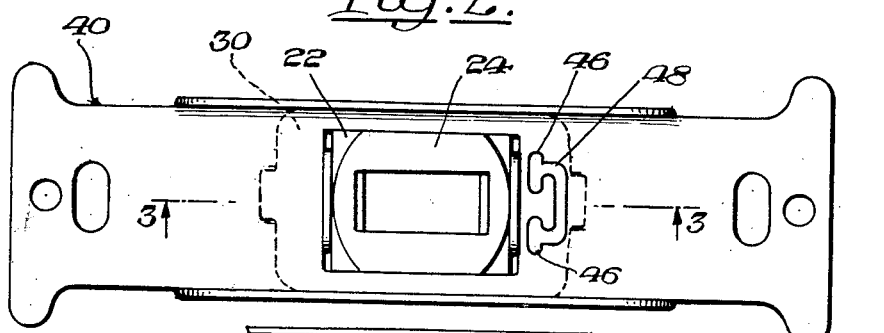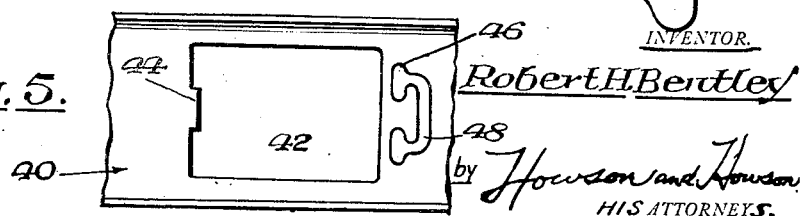

2,778,869

MOUNTING FOR ELECTRIC WIRING DEVICES

Robert H. Bentley, Hartford, Conn., assignor to The Arrow-Hart & Hegeman Electric Company, Hartford, Conn., a corporation of Connecticut Application November 5, 1953, Serial No. 390,398

2 Claims. (Cl. 174—53)

This invention relates to electric wiring devices and more particularly to mounting means for such devices.

A considerable number of electric wiring devices and their mounting means are sold in disassembled condition. The purpose of that is to permit the seller or the customer to mount any one of a number of different types of electric wiring devices (for example, electric switches, receptacles and pilot lights) in a mounting strap or supporting bridge alternatively or interchangeably. This expedient enables the dealer to carry a smaller stock and it also reduces the manufacturing cost since it is not necessary at the plant to assemble the device in the bridge. Moreover when a combination of devices in a multigang bridge is desired, it is possible for the particular combination desired to be made up at the point of purchase or by the customer whereby a considerable variety of combinations is available which would otherwise be impossible for the dealer to carry in stock.

Heretofore the underwriters have only required that electric wiring devices withstand a 20 pound pull on the wires attached to the terminals of the device. In anticipation of an increase in the standards to require that such devices withstand a 50 pound pull, it has been necessary to find new ways to support the aforesaid devices in order to meet such a higher standard.

Therefore it is an object of this invention to provide an improved mounting for electric wiring device-bodies which will withstand a 50 pound pull upon the wire terminals of the device.

Another object is to provide an improved mounting of the foregoing type which will not increase materially the cost of mounting the device upon its supporting strap.

Other objects and advantages of the invention will appear as it is described in connection with the accompanying drawing.

In the drawing:

Fig. 1 is an exploded perspective view of the insulating body and associated mounting means embodying the invention.

Fig. 2 is a plan view of the invention illustrated in Fig. 1 and as applied to a single gang supporting strap.

Fig. 3 is a side elevation view partly broken away of the device illustrated in Fig. 2.

Fig. 4 is an end section view.

Fig. 5 is a fragmentary plan view of the midportion of the conventional supporting bridge.

Referring to the drawing, the particular embodiment in connection with which the invention will be described is applied to a lever-operated snap switch. It will be understood however that the invention is equally applicable to other types of wiring devices and is not limited to a switch nor to a device in which the casing has a cover on an open top.

The parts of the electric wiring device are housed within a hollow shell 10 of molded insulating or other suitable material. The shell is upwardly open.

A cover member 20 also made of molded insulating material is adapted to fit into the open top of the casing 10 and to rest upon a shoulder 14 formed within the casing just below the inner peripheral edge thereof so that the largest portion 28 of the cover 20 will lie within the top portion of the casing 10 flush with the top edge thereof. In the central portion of the cover, an upwardly standing rectangular neck 22 is formed, the dimensions of the neck being slightly less than the portion 28 of the cover which fits within the casing 10. The top portion of the neck is provided with a head 24 of such shape as to conveniently fit within the conventional openings in a face plate (not shown). Through the head and neck, a rectangular passage 26 is formed leading into the interior of the casing 10. Through the passage 26 the operating lever (not shown) of the switch extends in usual fashion.

In order to hold the cover and casing parts together and to provide means to mount those parts upon a conventional supporting strap or bridge, a mounting plate 30 is provided. The mounting plate 30 may be conveniently stamped from sheet metal into generally rectangular form with rounded corners. In the central portion thereof an aperture 32 is provided adapted to receive the neck 22. Extending from opposite ends of the mounting plate 30 are integral metal loops 34, 34' which are adapted to be bent down perpendicularly to the plane of the mounting plate (see Figs. 3 and 4) so as to lie along the end surfaces of the casing 10. Formed on the casing 10 are nubs 12, 12' adjacent the top end edges in position to be received within the apertures 35, 35' of the loops when the loops are bent down. In that way the mounting plate 30 is permanently attached to the casing 10 and holds the cover 20 securely in place thereon.

Extending inwardly into the opening 32 from opposite ends thereof when the mounting plate 30 is stamped and thereafter being bent upwardly out of the plane thereof are a second pair of metal loops 36, 36' integral with the plate 30. The open portions or slots 37, 37' of these loops are adapted to register with similar slots 23 formed in the neck 22.

The unit composed of the casing, cover and mounting plate 30 is adapted to be mounted upon a conventional supporting strap or bridge 40, of sheet metal stamped in the form of a strip of such length as to bridge the open top of a conventional outlet or wall box. In a central portion of the bridge 40, a hole 42 is provided of generally rectangular form to receive the mounting plate loops 36, 36', neck 22 and head 24 as the wiring device casing unit is inserted into the hole from the back side.

At one end of the hole 42 is an inwardly extending tongue 44 which is adapted to fit within the slot of one or another of the loops 36, 36'. The casing and mounting plate 30 as a unit are inclined when being inserted into the aperture 42 and the tongue 44 is fitted within the aperture of the loop 36. The unit is then tilted up until the top surface of the mounting plate 30 lies flush against the under surface of the supporting bridge 40. In order to permanently secure the unit in this position, the edge of opposite end of the hole 42 is deformed inwardly to engage with the loop 36'. In order that this edge of the hole 42 may be deformed inwardly, a U-shaped slot 48 with enlarged aligned ends 46 paralleling the edge of the hole 42 is punched in the bridge. The enlargements 46 are of such dimensions as to permit insertion of the end of a screwdriver therein. Upon twisting the end of the screwdriver, the metal at the end of the hole 42 is bent inwardly and forced into the slot 36' of the loop 36. This inward deformation may also be accomplished by inserting the screwdriver end into the transverse portion 48 and twisting it.

From the foregoing it will be observed that when the wiring device body is inserted into and mounted upon the bridge 40, the pull of the wires upon the wire terminals 16 will be transmitted from the casing through the nubs 12 to the mounting plate 30 and thence directly to the supporting strap 40. The cover and neck do not carry any stress and are not susceptible to breakage or chipping as in prior constructions. With the present improvement the 50 pound pull is easily possible without breakage or damage to the device. The mounting plate 30 thus performs a dual function in the present combination: It unites the cover and the base of the casing; and it provides the means for mounting the casing upon the supporting bridge through the cooperation of the loops 36 with the tongue 44 and deformed inward end of the hole 42.

Modifications within the scope of the invention will become apparent to those skilled in the art. Therefore the invention is not limited to the specific form and dimensions as illustrated in the drawing.

What is claimed is:

1. In an electric wiring device, an insulating casing having a neck extending therefrom, a mounting plate having an opening receiving said neck, endwise extensions from said plate bendable at right angles out of the plane of said plate and having apertures therein, nubs on opposite ends of said casing received in said plate apertures when said extensions are bent toward said casing, a supporting bridge for said device having a hole receiving said neck, outward extensions from said plate having slots therein, said outward extensions being bent up at right angles from the plane of the plate and entering said bridge hole, said slots being in the plane of the supporting bridge, one margin of said bridge hole being extended into one of said slots, the opposite margin of said bridge hole being bendable to extend into an opposite slot thereby to securely hold said mounting plate and casing on said bridge.

2. An electric switch as claimed in claim 1 wherein the casing comprises a forwardly open shell, and a cover fitting into said open front of the shell, and said mounting plate engages and holds said cover and shell together.

References Cited in the file of this patent

UNITED STATES PATENTS

| | | |
|---|---|---|
| 2,160,713 | Bentley | May 30, 1939 |
| 2,248,201 | Russell | July 8, 1941 |
| 2,506,212 | Grohsgal | May 2, 1950 |